United States Patent
Jin (10) Patent No.: US 10,281,016 B2
(45) Date of Patent: May 7, 2019

(54) CONTINUOUSLY VARIABLE TRANSMISSION DEVICE

(71) Applicant: Heung Gu Jin, Ansan-si (KR)

(72) Inventor: Heung Gu Jin, Ansan-si (KR)

( * ) Notice: Subject to any disclaimer, the term of this patent is extended or adjusted under 35 U.S.C. 154(b) by 311 days.

(21) Appl. No.: 15/317,547

(22) PCT Filed: Jun. 8, 2015

(86) PCT No.: PCT/KR2015/005692
§ 371 (c)(1),
(2) Date: Dec. 9, 2016

(87) PCT Pub. No.: WO2015/190765
PCT Pub. Date: Dec. 17, 2015

(65) Prior Publication Data
US 2017/0108100 A1   Apr. 20, 2017

(30) Foreign Application Priority Data
Jun. 10, 2014   (KR) .................. 10-2014-0070095

(51) Int. Cl.
*F16H 41/04* (2006.01)
*F16H 41/26* (2006.01)
*F16H 43/00* (2006.01)

(52) U.S. Cl.
CPC ............. *F16H 41/04* (2013.01); *F16H 41/26* (2013.01); *F16H 43/00* (2013.01)

(58) Field of Classification Search
CPC ........ F16H 37/084; F16H 41/04; F16H 41/26; F16H 43/00; F02C 3/113; F02B 27/0236; F05B 2250/02; F05B 2250/232
See application file for complete search history.

(56) References Cited

U.S. PATENT DOCUMENTS

| 5,713,201 A * | 2/1998 | Sakemi | F04D 13/02 |
| | | | 415/167 |
| 7,396,209 B2 * | 7/2008 | Miller | B62M 9/08 |
| | | | 416/170 R |

(Continued)

FOREIGN PATENT DOCUMENTS

| JP | 2000136701 A | 5/2000 |
| JP | 2013204469 | 10/2013 |

(Continued)

OTHER PUBLICATIONS

International Search Report of PCT/KR2015/005692.

*Primary Examiner* — Igor Kershteyn (57) ABSTRACT

The present invention is related to a non-stage transmission apparatus for changing the power transmission speed and the power transmission torque by changing an inlet path of the fluid. Its construction is characterized in that it comprises: a center shaft 1 which is axial rotationally fixed in a casing to transmit a rotational force to the outside; a turbine body 5 which is fixed to a periphery of the center shaft 1 and is in a form of conical barrel in which a radius varies along a longitudinal direction of the center shaft 1; plural transverse partition plates 7 protruding from a peripheral wall of the turbine body 5 in a direction forming a right angle to the center shaft 1; blades 9 installed at the peripheral wall of the turbine body 5 along a longitudinal direction of the center shaft 1; and a hydraulic pressure supply means for supplying a high pressure fluid to the blades 9 of the turbine body 5 through nozzles to make the turbine body 5 have a rotational force to rotate having the center shaft as a center.

8 Claims, 7 Drawing Sheets

(56) References Cited

U.S. PATENT DOCUMENTS

| | | | | |
|---|---|---|---|---|
| 2005/0111982 A1* | 5/2005 | Miller | ............... | B62M 11/00 |
| | | | | 416/160 |
| 2014/0017065 A1* | 1/2014 | Dale | ............... | F03B 3/04 |
| | | | | 415/68 |
| 2015/0330491 A1* | 11/2015 | Matsumura | ............... | F16H 3/423 |
| | | | | 475/149 |

FOREIGN PATENT DOCUMENTS

| KR | 20090076157 A | 7/2009 |
|---|---|---|
| KR | 20100124561 A | 11/2010 |
| KR | 20110016542 A | 2/2011 |
| KR | 20110137855 A | 12/2011 |

\* cited by examiner

CONTINUOUSLY VARIABLE TRANSMISSION DEVICE

CROSS-REFERENCE TO PRIOR APPLICATIONS

This application is a National Stage Patent Application of PCT International Patent Application No. PCTKR2015005692 (filed Jun. 8, 2015) under 35 U.S.C. § 371, which claims the benefit of foreign priority of Korean Patent Application No. 1020140070095 (filed Jun. 10, 2014), the subject matter of which is hereby incorporated by reference in its entirety.

BACKGROUND

(a) Technical Field

The present invention relates to a non-stage transmission apparatus, and more particularly, it relates to related to a hydraulic non-stage transmission apparatus for changing the power transmission speed and the power transmission torque by changing an inlet path of a fluid.

(b) Background Art

A transmission apparatus is an apparatus used to transmit a rotational force generated at an engine to wheels by changing the rotational force, and in recent days, automatic transmission apparatus is widely supplied. In general, the transmission apparatus is composed of several stages according to the rotational force outputted and the energy consumption occurs at a process of changing the stages. It is since only after a residual revolution acts on the current stage immediately before a speed changing, the stage changes to another stage.

Conventional non-stage transmission apparatuses have been suggested to solve this problem. As an example among the conventional non-stage transmission apparatuses, Korea Patent Application 10-2009-0043633 discloses a lever crank mechanism between an input shaft which performs one-way rotational movement by an external force (a motor or an engine or the like) and an output shaft which is transmitted a driving force of the input shaft and transmits it to the outside. However, these have problems that they are complicated in their structures so that various costs are increased.

PRIOR ART DOCUMENTS

Patent Documents (Patent Document 0001) Korea Patent Application 10-2009-0043633

SUMMARY OF THE DISCLOSURE

An object of the present invention about the above problems is to provide a hydraulic non-stage transmission apparatus which has simple construction and smooth action. A more concrete object of the present invention is to provide a hydraulic non-stage transmission apparatus which minimizes a loss of power, a noise and a physical impact at the time of change of revolution number, improves durability, and saves the cost of maintenance.

The object described above is accomplished by a non-stage transmission apparatus comprising: a center shaft which is axial rotationally fixed in a casing to transmit a rotational force to the outside; a turbine body which is fixed to a periphery of the center shaft and is in a form of conical barrel in which a radius varies along a longitudinal direction of the center shaft; plural transverse partition plates protruding from a peripheral wall of the turbine body in a direction forming a right angle to the center shaft; blades installed at the peripheral wall of the turbine body along a longitudinal direction of the center shaft and provided in a plural number at a certain spacing along a circumferential direction of the turbine body; and a hydraulic pressure supply means for supplying a high pressure fluid to the blades of the turbine body through nozzles to make the turbine body have a rotational force to rotate having the center shaft as a center, wherein the hydraulic pressure supply means comprises a nozzle control part which makes the nozzle to selectively supply the hydraulic pressure to a place requiring the hydraulic pressure among the plural blades installed along the longitudinal direction of the center shaft.

According to one aspect of the present invention, the nozzle control part can comprises: an injection pipe which is fixed through the entire length along the extension direction of the center shaft and is provided with plural nozzles opened toward the blades; a piston moving forwards and afterwards along the longitudinal direction of the injection pipe while being closely contacting and inserted into the injection pipe; a hydraulic pressure forming part connected to one side of the injection pipe in order to supply a high pressure fluid; and a transmission actuation part which changes the rotational force of the turbine body by adjusting the injection type of the fluid by moving the piston.

Other object of the present invention is accomplished by a non-stage transmission apparatus comprising: a center shaft which is axial rotationally fixed in a casing to transmit a rotational force to the outside; a turbine body which is fixed to and combined to a periphery of the center shaft and is formed in such a way that plural rings of the form of cylindrical bodies having different diameters are fixed in circles concentric about the center shaft; plural blades which are installed to connect between the ring and ring to apply the rotational force to the center shaft by the fluid pressure entering in the direction from the center shaft and are provided at a certain spacing along a circumferential direction of the ring; and a hydraulic pressure supply means for supplying a high pressure fluid to the blades of the turbine body through nozzles to make the turbine body have a rotational force to rotate having the center shaft as a center, wherein the hydraulic pressure supply means comprises a nozzle control part which makes the nozzle to selectively supply the hydraulic pressure to a place requiring the hydraulic pressure among the plural blades installed along the radial direction of the center shaft.

According to one aspect of the present invention, the nozzle control part can comprises: an injection pipe which is fixed through the entire length along the extension direction of the center shaft and is provided with plural nozzles opened toward the blades; a piston moving forwards and afterwards along the longitudinal direction of the injection pipe while being closely contacting and inserted into the injection pipe; a hydraulic pressure forming part connected to one side of the injection pipe in order to supply a high pressure fluid; and a transmission actuation part which changes the rotational force of the turbine body by adjusting the injection type of the fluid by moving the piston.

Effect of the Present Invention

According to the structure described above, in the first embodiment, the transmission apparatus is provided in which if the fluid is supplied thorough a lower end of large diameter of a conical barrel, the revolution speed of the center shaft is decreased and the revolution force is accordingly increased, and if the fluid is supplied through an upper end, the revolution speed of the center shaft is increased and the revolution force is accordingly decreased. Also in the second embodiment, the transmission apparatus is provided to which identical principle is applied.

According to the present invention, a non-stage transmission apparatus is provided in which mechanical action is minimized so that the structure is very simple and the durability is increased. In addition, a transmission apparatus is provided in which the frictional resistance is small so that the efficiency is increased and the speed change is smoothly accomplished, and also a multi-purpose non-stage transmission apparatus is provided which can be widely applied to various transportation vehicles from a two-wheeled vehicle to a cargo truck.

DETAILED DESCRIPTION

Below, concrete contents of the present invention will be described in detail with reference to the accompanying FIGS. 1 to 7. First, a first embodiment will be described with reference to FIGS. 1 to 4, and then a second embodiment will be described with reference to FIGS. 5 to 7.

A center shaft 1 is axial rotationally fixed in a casing 3. The center shaft 1 transmits a rotational force to outside through the axial rotation and is connected to an axle in case of a car. A casing 3 provides a space receiving a turbine body 5 and it is preferable for improvement of efficiency that an inner wall surface closely contacts an outer surface of the turbine body 5.

The turbine body 5 is fixed to a periphery of the center shaft 1 so as to be rotated together therewith, and according to the first embodiment, is in a form of conical barrel in which a radius varies along a longitudinal direction of the center shaft 1.

Plural transverse partition plates 7 protrude from a peripheral wall of the turbine body 5 in a direction forming a right angle to the center shaft 1. It is preferable that the transverse partition plates 7 closely contact the inner wall surface of the casing 3 as maximum as possible. That is, it is preferable that the fluid cannot go across the transverse partition plates 7.

Blades 9 are installed at the peripheral wall of the turbine body 5 along a longitudinal direction of the center shaft 1. The blades 9 are provided in a plural number at certain spacing along a circumferential direction of the turbine body 5 and have a curved form to be similar to a general blade of the turbine or an impeller.

It is most preferable for rigidity and efficiency that the blades 9 and the transverse partition plates 7 are integral. They can be made to be completely integrated by a cutting forming or to be integral by assembly.

A hydraulic pressure supply means supplies a high pressure fluid to the blades 9 of the turbine body 5 through nozzles to make the turbine body 5 have a rotational force to rotate having the center shaft 1 as an axial center. The high pressure fluid becomes an actuating fluid so as to apply the rotational force to the turbine body 5 and then to be discharged along a direction of arrow A1. As stated above, it is necessary for a satisfied efficiency to make the fluid not to flow across between the transverse partition plates 7. If the fluid enters through a nozzle 15 installed at a certain radius at the center shaft 1, it is preferable that the fluid is discharged only through a discharge hole 29 installed at the same radius. This can be accomplished by a degree of precision.

The hydraulic pressure supply means comprises a hydraulic pressure forming part 19 for generating the hydraulic pressure. The hydraulic pressure generated at the hydraulic pressure forming part 19 is supplied to the turbine body 5 and then recovered therefrom and supplied again to the hydraulic pressure forming part 19. That is, the fluid works while being circulated along a closed circuit. The hydraulic pressure forming part 19 can be an engine of a car, a pedal of a bicycle, or various kinds of hydraulic pump.

According to an embodiment of the present invention, a bi-pass pipe 20 can be installed at a fore end and a rear end of the hydraulic pressure forming part 19 and a flow control valve 22 can be installed at the middle of the bi-pass pipe 20. If the fluid is made not to go through the hydraulic pressure forming part 19 but to go through the bi-pass pipe 20, it will be supplied to the turbine body 5 as it is without rise of the hydraulic pressure. This case will be a case where there is no transmission of the rotational force, that is, an idle rotation state. The flow control valve 22 can be installed either at a junction N of a main pipe 24 and the bi-pass pipe 20 or a three way valve can be used as the flow control valve. It is preferable that this construction comprises a function of a clutch which interrupts the power transmission by making the transmission apparatus of the present invention control the flow control valve 22.

According to the present invention, the hydraulic pressure supply means comprises a nozzle control part 11 which makes the nozzle to selectively supply the hydraulic pressure to a place requiring the hydraulic pressure among the plural blades 9 installed along the longitudinal direction of the center shaft 1.

The nozzle control part 11 comprises an injection pipe 13 fixed to be parallel to an inclination surface of the turbine body 5 and, the plural nozzles 15 provided having a spacing along the longitudinal direction of the injection pipe 13. As shown, the nozzles 15 are in the form of a simple hole formed by perforation along the longitudinal direction of the injection pipe 13, however, it is not limited thereto. The injection pipes 13 are fixed through the entire length along the extension direction of the center shaft 1, and can be provided in a number more than or equal to one. The injection pipe 13 is installed in the casing 3 of dual walls. The nozzles 15 are open toward the blades 9.

In the meantime, the injection pipe 13 acts as a cylinder and the piston 17 moves forwards and afterwards along the longitudinal direction of the injection pipe 13 while being closely contacting and inserted into the injection pipe 13. The hydraulic pressure forming part 19 is connected to one side of the injection pipe 13 in order to apply a pressure to the blade 9 by injecting a high pressure fluid through the injection pipe 13. The hydraulic pressure forming part 19 comprises a hydraulic pressure supply pipe 21.

A rear end of the piston 17 is connected to a transmission actuation part 25. The transmission actuation part 25 moves the piston 17 forwards and afterwards in a direction of an arrow A2 by acting automatically according to a load as in an automatic transmission of a general car. As the case requires, it is also necessary to be able to actuate the transmission actuation part 25 manually. For the construction and action of this transmission actuation part 25, the automatic transmission of a general car can be referred to.

The transmission actuation part 25 changes the rotational force of the turbine body 5 by adjusting the injection type of the fluid by moving the piston 17.

According to an embodiment of the present invention, if the piston 17 is placed at the lowest end, the fluid will be injected toward the turbine body 5 through all nozzles 15. This state becomes a state of lowest rotation speed and largest rotation force. In this state, most of the fluid will enter through blades 9' installed at the lowest end of the turbine body 5 where the smallest resistance acts.

In addition, if the piston 17 gradually moves upward by the transmission actuation part 25 so that the fluid is injected only through the nozzle 15 placed at the top of the turbine body 5, the rotational speed is increased and the rotational force is decreased.

Lastly, in a case where the piston 17 is placed at the uppermost end so that the fluid is injected to blades 9" placed at the uppermost end of the turbine body, the rotational force will be a minimum and the rotational speed will be a maximum. This is self-evident by a relation T=F×r between the force F, rotational force T (torque) and radius R (radial).

It is preferable for obtaining a large rotational force that the fluid of the high pressure is supplied in a condition where the fluid of the high pressure is in right angle to the surface direction of the blades 9. It is preferable that the nozzles 15 are inclined to the maximum toward the rotational direction of the turbine body so that the ideal state is near, and it is preferable that the blades 9 are in shape of a curved surface. The direction of the opening of the nozzles 15 are also preferably formed spaced outside to the maximum form the center shaft 1.

In the meantime, the fluid supplied to the turbine body 5 is discharged to the outside of the casing 3 for the circulation. The fluid flows out through a discharge pipe 27 installed in the casing 3 in a manner similar to the injection pipe 13. Plural discharge holes 29 are provided along a longitudinal direction of the discharge pipe 27 and these discharge holes 29 are provided opened at an inner wall of the casing 3.

Figure 3:
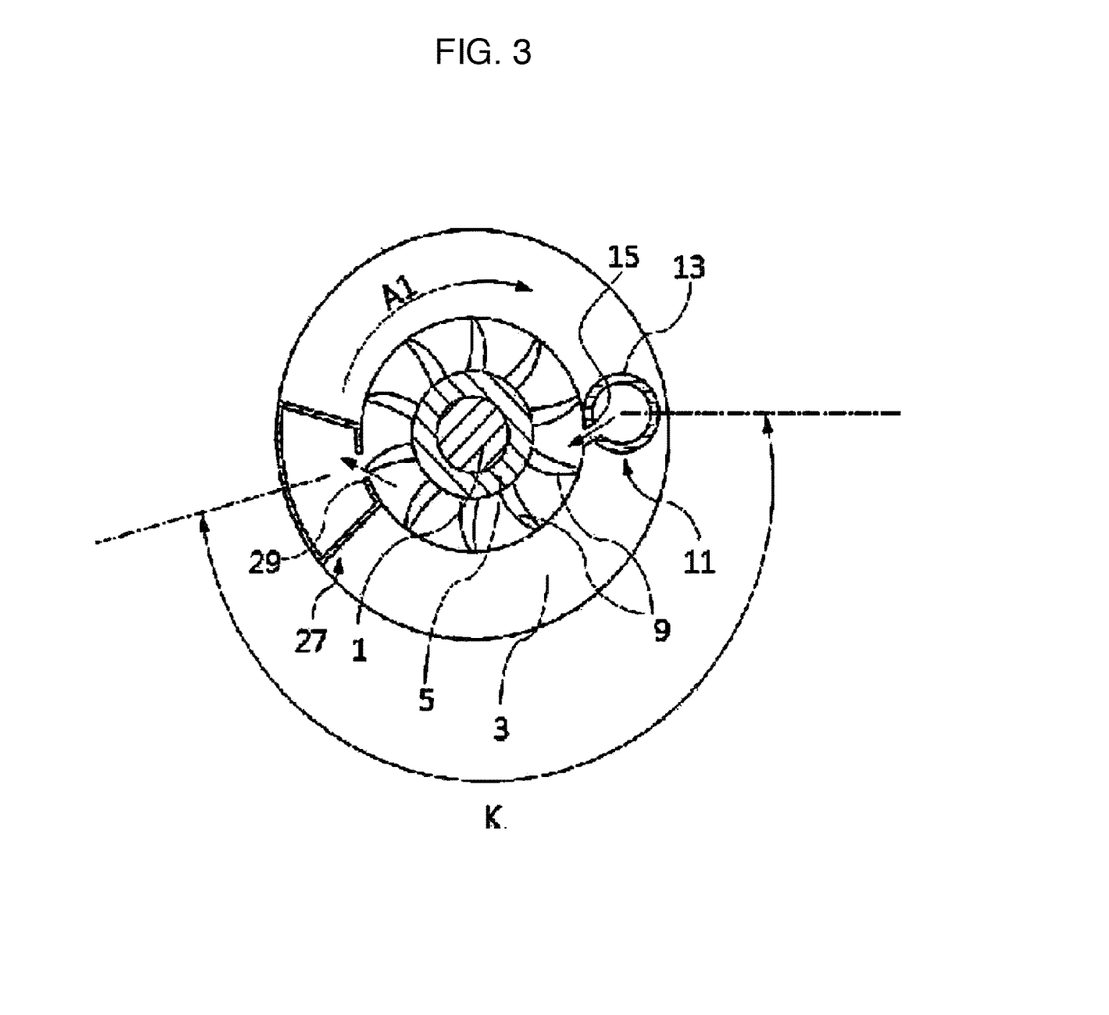
FIG. 3 is a schematic top view structural drawing of the transmission apparatus according to the first embodiment of the present invention.
Figure 4:
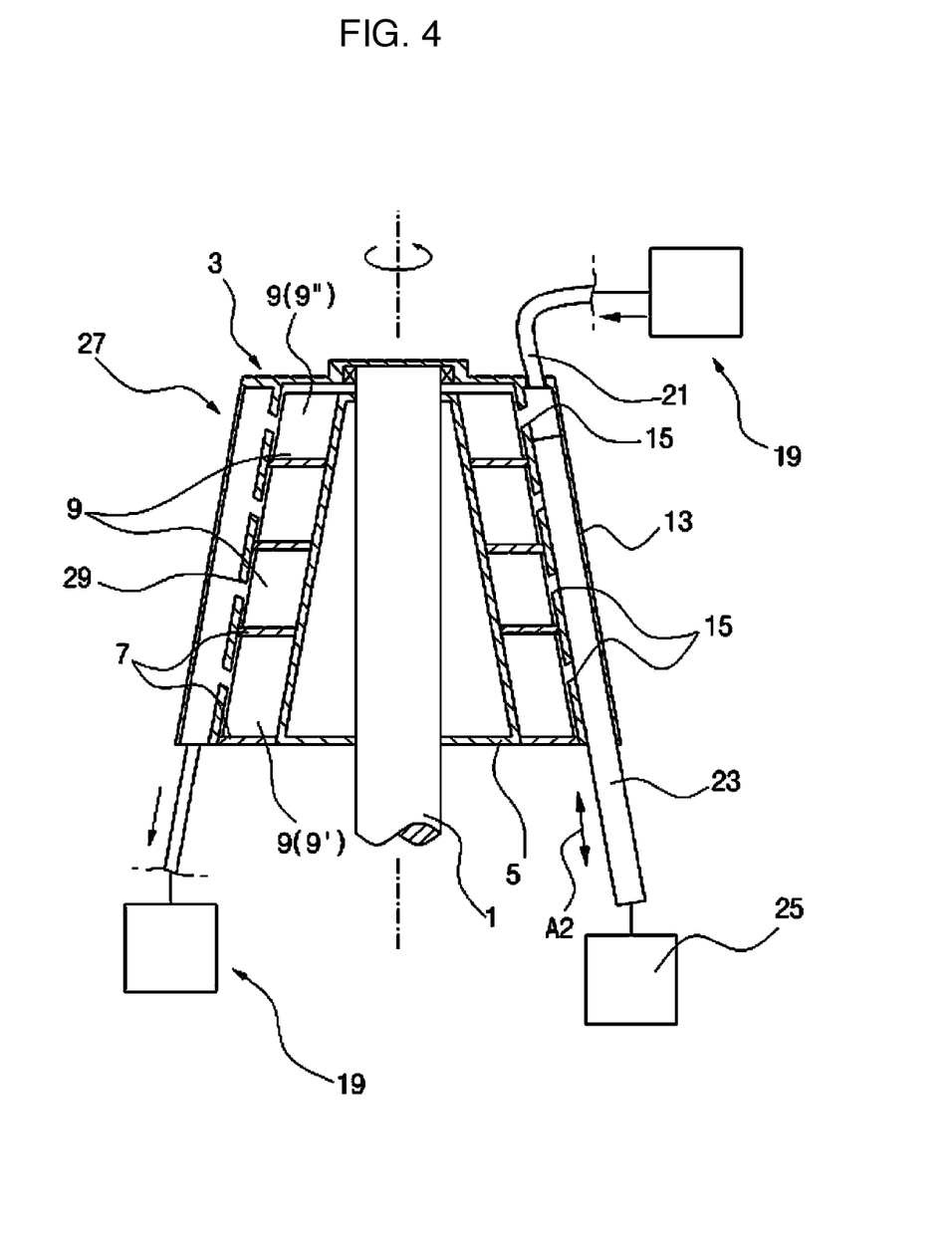
FIG. 4 is a schematic longitudinal sectional view structural drawing of the transmission apparatus according to the first embodiment of the present invention.

The discharge pipe 27 is provided in such a way that it winds around the turbine body 5 in an angle K as much as 120~180° as shown in the top view of FIG. 3 and then is discharged. The fluid having escaped to outside of the casing 3 through the discharge pipe 27 circulates the hydraulic pressure forming part 19 and enters the injection pipe 13 again.

As shown, the injection pipe 13 and the discharge pipe 27 each is shown in one column, however, it is not limited thereto, and can each be provided in plural columns. This is to disperse the force so as to prevent a stress concentration phenomenon.

Figure 1:
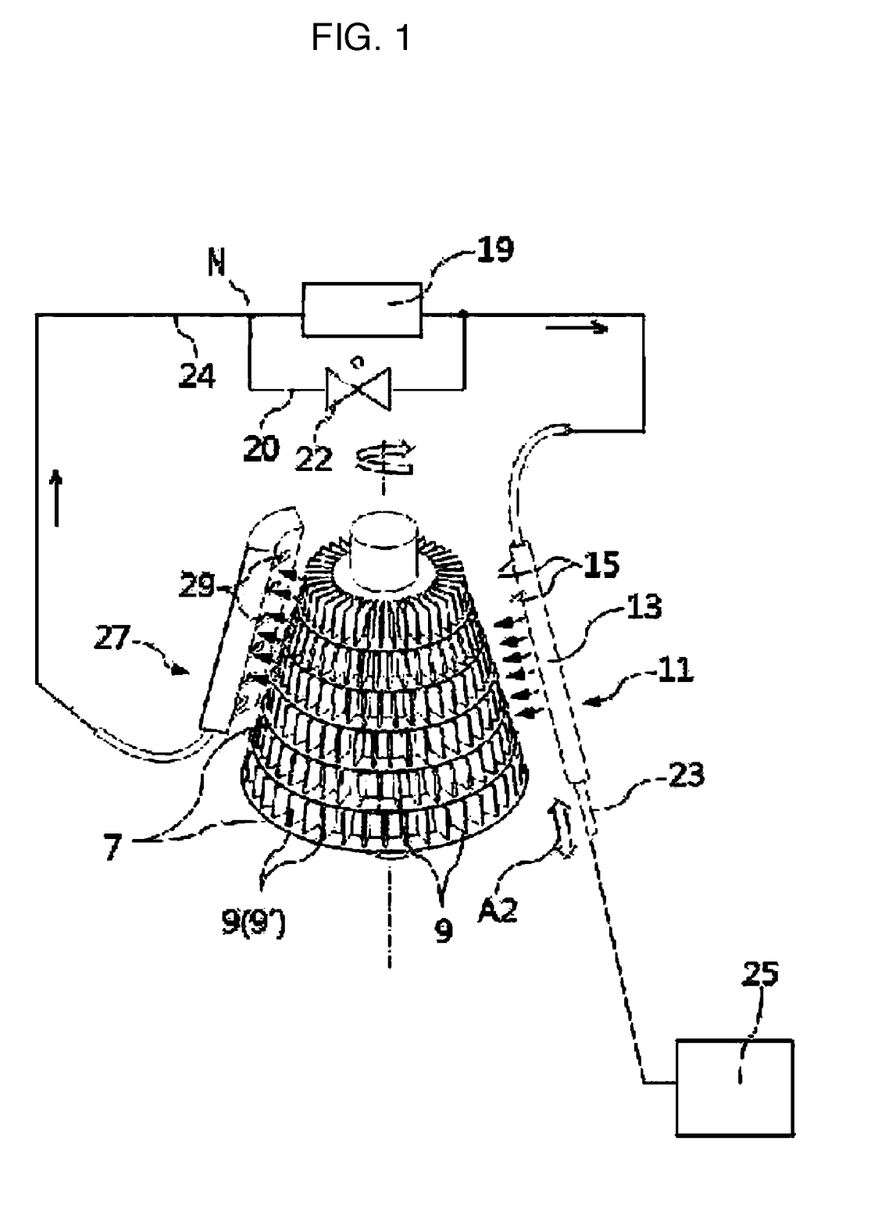
FIG. 1 is a structural drawing illustrating a principle of a transmission apparatus according to a first embodiment of the present invention.
Figure 2:
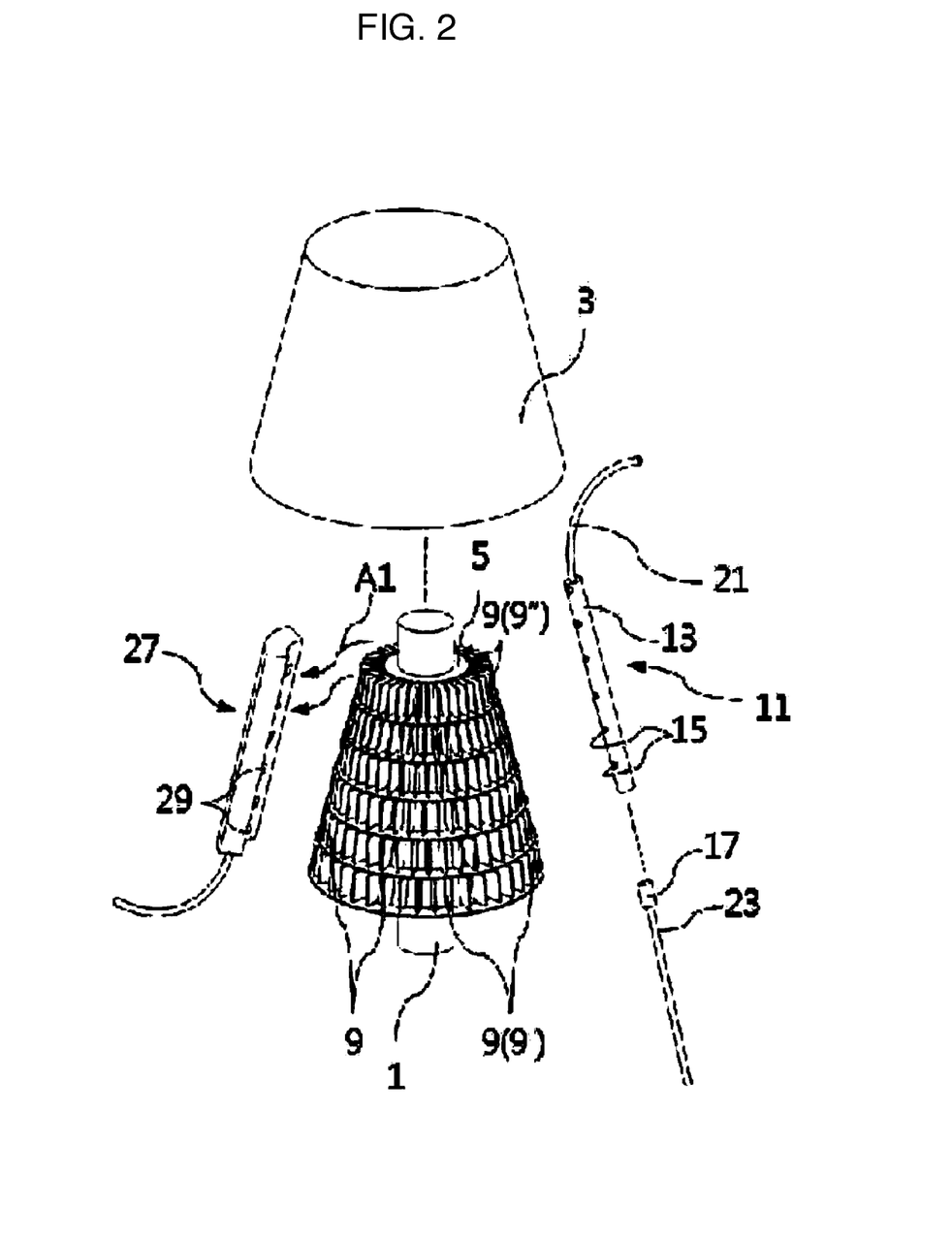
FIG. 2 is an exploded perspective view showing a schematic structure of the transmission apparatus according to the first embodiment of the present invention.
Figure 5:
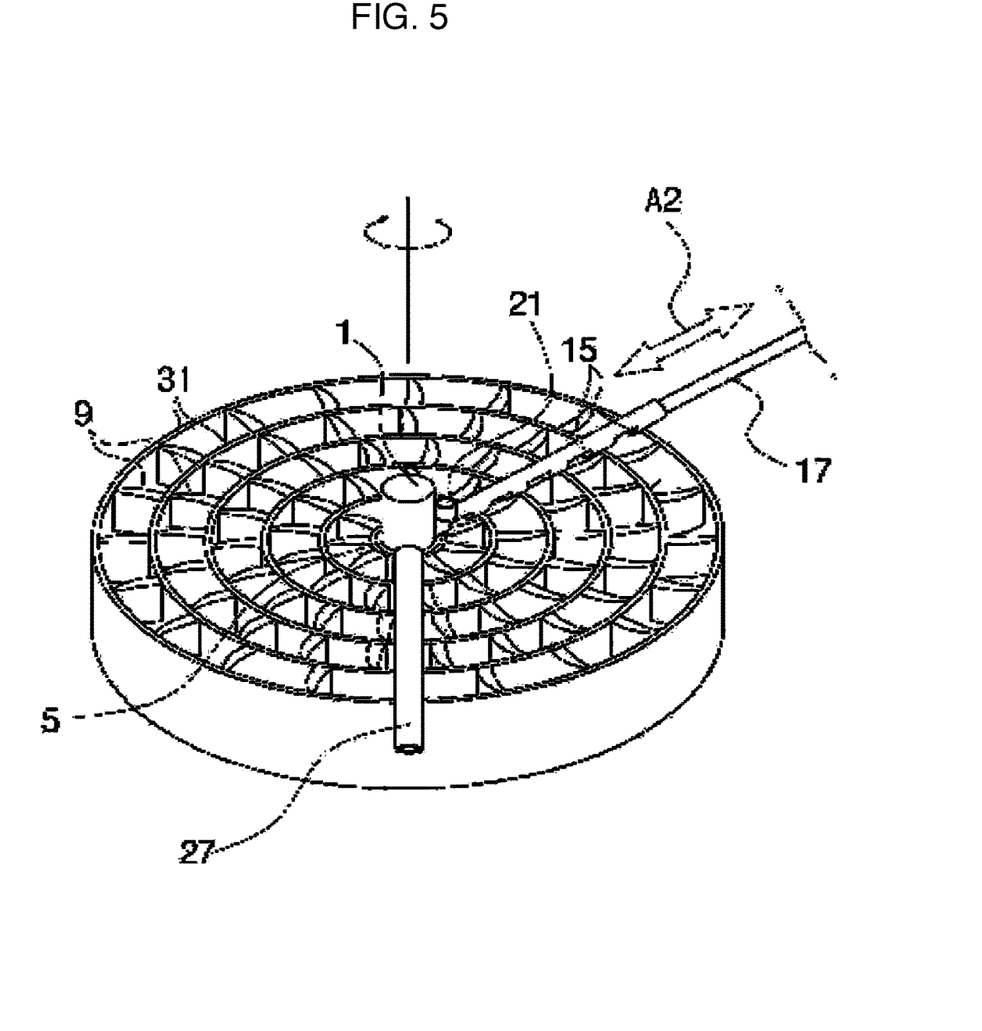
FIG. 5 is a perspective view illustrating a principle of a transmission apparatus according to a second embodiment of the present invention.

For a reference, the injection pipe 13 and the discharge pipe 27 are shown to be spaced from the turbine body 5, 5' in each perspective view of FIGS. 1, 2, and 5, however, this is only for the convenience of understanding, and it should be understood that they are installed in very close contact to the turbine body 5, 5'. In addition, the casing 3, 3' are also installed in very close contact to the turbine body 5, 5'. The injection pipe 13 and the discharge pipe 27 are installed so as to be integral with the casing 3, 3'. The injection pipe 13 and the discharge pipe 27 are not visible when viewing from the inside of the casing 3 but only the nozzles 15 and the discharge hole 29 are visible. It is necessary that a working fluid enters and is discharged only through the nozzles 15 and the discharge holes 29. The fluid simultaneously performs a function of cooling agent and lubricating agent.

Figure 6:
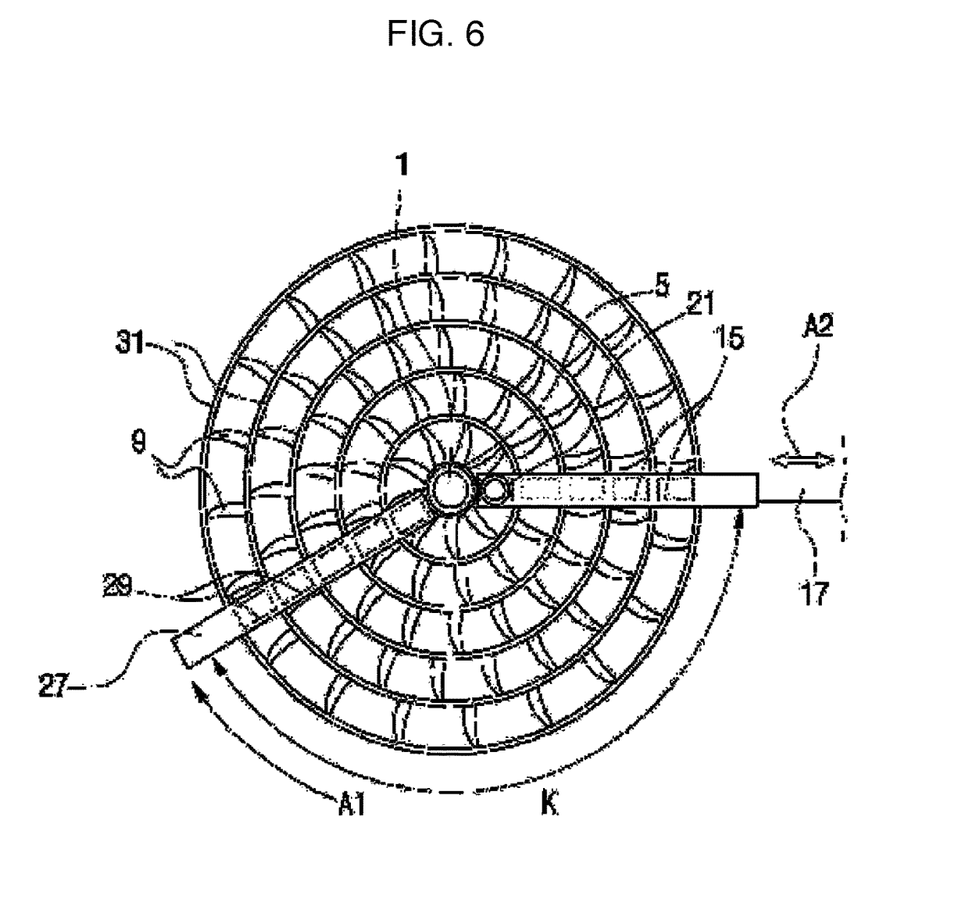
FIG. 6 is a schematic top view structural drawing of the transmission apparatus according to the second embodiment of the present invention.
Figure 7:
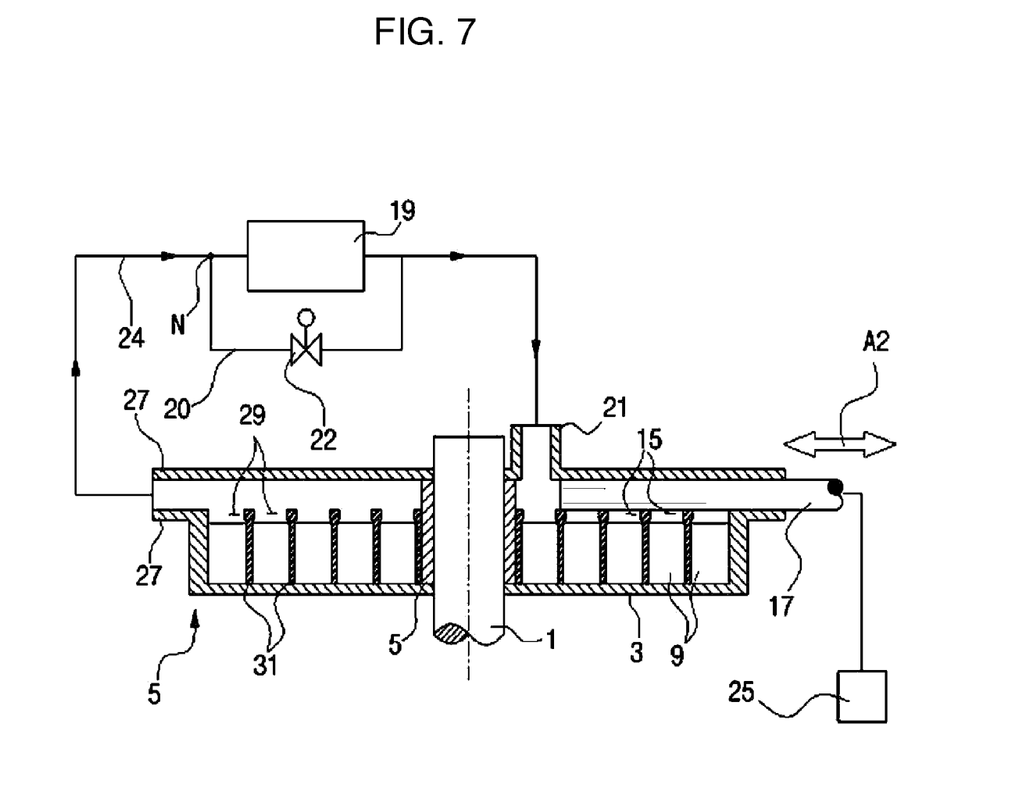
FIG. 7 is a schematic longitudinal sectional view structural drawing of the transmission apparatus according to the second embodiment of the present invention.

Below, other embodiment of the present invention will be described mainly with reference to FIGS. 5 to 7.

This embodiment is related to other form of the turbine body 5'. For the shape and all the contents except the items accompanying the shape of the turbine body 5, 5', the description of previous embodiment can be referred to. Therefore, for the reference number not described below, above embodiment can be referred to. According to this embodiment, the turbine body 5, 5' is in the form of a cylindrical body.

The center shaft 1 is still axial rotationally fixed in the casing 3' and transmits the rotational force to the outside.

The turbine body 5' is fixed to the periphery of the center shaft 1 and is formed in such a way that plural rings 31 of the form of cylindrical bodies having different diameters are fixed in circles concentric about the center shaft 1.

The plural blades 9 are installed to connect between neighboring rings 31 to apply the rotational force to the center shaft 1 by the high pressure fluid entering in the direction from the center shaft 1. The blades 9 are provided at certain spacing along a circumferential direction of the ring 31 and can be installed in a form of curved surface or inclined form. The ring 31 in this embodiment performs the function of the transverse partition plates 7 in the previous embodiment. That is, the ring 31 rotates while being closely contacting the inner wall of the casing 3, 3'. Therefore, the fluid cannot go across between the rings 31. If the fluid enters through a nozzle 15 installed at a certain radius at the center shaft 1, it can be discharged only through a discharge hole 29 installed at the same radius.

The hydraulic pressure supply means injects and supply the high pressure fluid to the blades 9 of the turbine body 5' through the nozzle to make the turbine body 5' have the rotational force to rotate having the center shaft 1 as the center.

The hydraulic pressure supply means comprises a nozzle control part 11 which makes the nozzle to selectively supply the hydraulic pressure to a place requiring the hydraulic pressure among the plural blades 9 installed along the radial direction of the center shaft.

The nozzle control part 11 comprises the injection pipe 13, the piston 17 installed in the injection pipe 13, the hydraulic pressure forming part 19, and the transmission actuation part 25.

The injection pipe 13 is installed in the casing 3' in the right angle to the center shaft 1. The plural nozzles 15 opening toward the blades 9 are provided along the longitudinal direction of the injection pipe 13.

The injection pipe 13 acts as a cylinder and the piston 17 moves forwards and afterwards along the longitudinal direction of the injection pipe 13 while being closely inserted into the injection pipe 13. The hydraulic pressure forming part 19 is connected to one side of the injection pipe 13 in order to supply the high pressure fluid. The transmission actuation part 25 changes the rotational force of the turbine body 5' by adjusting the injection type of the fluid by moving the piston 17.

If the fluid is injected and supplied to the edge of the turbine body 5', the rotational force is increased and the number of revolution is decreased. If the fluid is injected and supplied to the center of the turbine body 5', the rotational force is decreased and the number of revolution is increased. This principle is same as that explained above (T=F×r).

The structure shown and described above is only preferred embodiments based on the technical thoughts of the present invention. It should be appreciated that those skilled in the art can make a variety of changes and practice them based on ordinary technical common sense, however, all those changes are included in the scope of the present invention.

What is claimed is:

1. A non-stage transmission apparatus comprising:
   a center shaft which is axial rotationally fixed in a casing to transmit a rotational force to the outside;
   a turbine body which is fixed to a periphery of the center shaft and is in a form of conical barrel in which a radius varies along a longitudinal direction of the center shaft;
   plural transverse partition plates protruding from a peripheral wall of the turbine body in a direction forming a right angle to the center shaft;
   blades installed at the peripheral wall of the turbine body along a longitudinal direction of the center shaft and provided in a plural number at a certain spacing along a circumferential direction of the turbine body; and
   a hydraulic pressure supply means for supplying a high pressure fluid to the blades of the turbine body through nozzles to make the turbine body have a rotational force to rotate having the center shaft as a center,
   wherein the hydraulic pressure supply means comprises a nozzle control part which makes the nozzle to selectively supply the hydraulic pressure to a place requiring the hydraulic pressure among the plural blades installed along the longitudinal direction of the center shaft.

2. The non-stage transmission apparatus of claim 1, wherein the nozzle control part comprises:
   an injection pipe which is fixed through the entire length along the extension direction of the center shaft and is provided with plural nozzles opened toward the blades;
   a piston moving forwards and afterwards along the longitudinal direction of the injection pipe while being closely contacting and inserted into the injection pipe;
   a hydraulic pressure forming part connected to one side of the injection pipe in order to supply a high pressure fluid; and
   a transmission actuation part which changes the rotational force of the turbine body by adjusting the injection type of the fluid by moving the piston.

3. The non-stage transmission apparatus of claim 1, wherein the hydraulic pressure supply means recovers the fluid which is supplied to the turbine body, raises the pressure by the hydraulic pressure forming part, and then again supplies the fluid to the turbine body.

4. The non-stage transmission apparatus of claim 3, further comprising:
   a bi-pass pipe connecting a fore end and a rear end of the hydraulic pressure forming part; and
   a flow control valve installed on the bi-pass pipe,
   whereby the fluid can be supplied to the turbine body without going through the hydraulic pressure forming part.

5. A non-stage transmission apparatus comprising:
   a center shaft which is axial rotationally fixed in a casing to transmit a rotational force to the outside;
   a turbine body which is fixed to and combined to a periphery of the center shaft and is formed in such a way that plural rings of the form of cylindrical bodies having different diameters are fixed in circles concentric about the center shaft;
   plural blades which are installed to connect between the ring and ring to apply the rotational force to the center shaft by the fluid pressure entering in the direction from the center shaft and are provided at a certain spacing along a circumferential direction of the ring; and
   a hydraulic pressure supply means for supplying a high pressure fluid to the blades of the turbine body through nozzles to make the turbine body have a rotational force to rotate having the center shaft as a center,
   wherein the hydraulic pressure supply means comprises a nozzle control part which makes the nozzle to selectively supply the hydraulic pressure to a place requiring the hydraulic pressure among the plural blades installed along the radial direction of the center shaft.

6. The non-stage transmission apparatus of claim 5, wherein the nozzle control part comprises:
   an injection pipe which is fixed through the entire length along the extension direction of the center shaft and is provided with plural nozzles opened toward the blades;
   a piston moving forwards and afterwards along the longitudinal direction of the injection pipe while being closely contacting and inserted into the injection pipe;
   a hydraulic pressure forming part connected to one side of the injection pipe in order to supply a high pressure fluid; and
   a transmission actuation part which changes the rotational force of the turbine body by adjusting the injection type of the fluid by moving the piston.

7. The non-stage transmission apparatus of claim 5, wherein the hydraulic pressure supply means recovers the fluid which is supplied to the turbine body, raises the pressure by the hydraulic pressure forming part, and then again supplies the fluid to the turbine body.

8. The non-stage transmission apparatus of claim 7, further comprising:
   a bi-pass pipe connecting a fore end and a rear end of the hydraulic pressure forming part; and
   a flow control valve installed on the bi-pass pipe,
   whereby the fluid can be supplied to the turbine body without going through the hydraulic pressure forming part.

* * * * *